Oct. 21, 1952 — T. A. ST. CLAIR — 2,614,582
PRESSURE SEALED RELIEF VALVE
Filed Aug. 6, 1947

INVENTOR.
Theodore A. St. Clair
BY Darby & Darby
Att'ys.

Patented Oct. 21, 1952

2,614,582

UNITED STATES PATENT OFFICE 2,614,582

PRESSURE SEALED RELIEF VALVE

Theodore A. St. Clair, Bartlesville, Okla., assignor to Phillips Petroleum Company, a corporation of Delaware Application August 6, 1947, Serial No. 766,704

2 Claims. (Cl. 137—512)

This invention relates to improvements in the construction of relief valves for pressure fluid storage tanks.

An object of this invention is to provide in a spring-loaded pressure relief valve a construction whereby the valve is fluid sealed by means of the pressure of the contents of the tank.

The valve herein disclosed was developed for use on storage tanks for liquid petroleum gas but those skilled in the art will readily appreciate its broader field of variations.

Another object of the invention is to provide a valve construction of such type that the gas sealing disc or ring can be replaced while the valve is in operation.

Other and more detailed objects of the invention will be apparent from the following description of the embodiment thereof illustrated in the attached drawing.

This invention resides substantially in the combination, construction, and relative location of parts, all as will be hereinafter described.

In the accompanying drawings—

Figure 1:
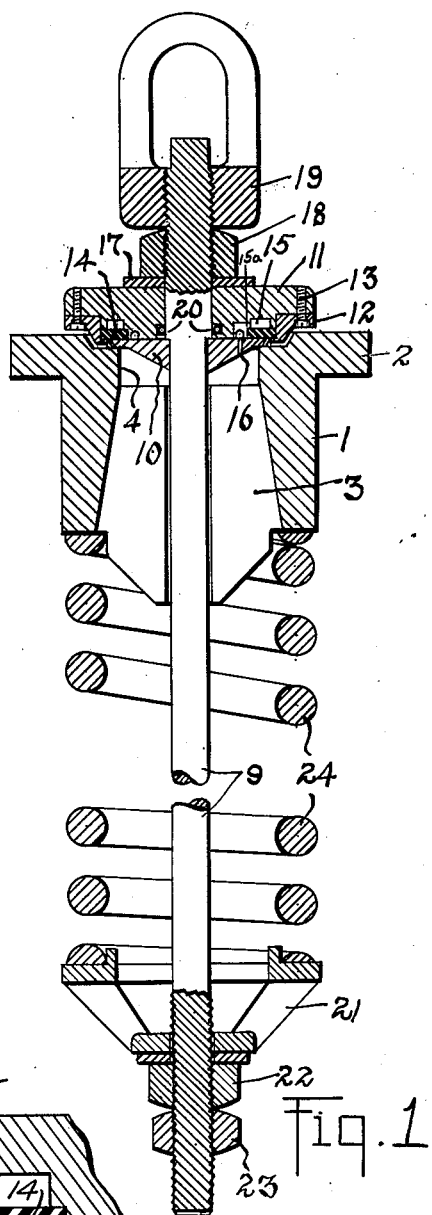
Figure 2:
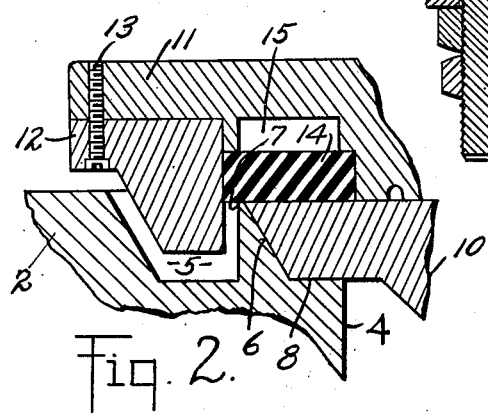

Figure 1 is a vertical central cross-sectional view through a valve embodying the features of this invention; and Figure 2 is an enlarged detail cross-sectional view of the seat construction of the valve.

As illustrated, the structure includes a fixture for attaching the valve to a storage tank. This fixture consists of a cylindrical sleeve 1 having an integral flange 2 and a series of internal radial plate-like spokes 3 forming a guide for the valve stem. The fixture 1—2 has, of course, a central passage terminating at its upper end in a cylindrical opening 4.

As shown in Figure 2, the region surrounding opening 4 is cut away to form an annular channel 5 and a right angle shoulder 8 thereby forming a vertically extending annulus 6 having a valve seat 7 on its upper edge.

The valve stem or rod 9 has a valve disc 10 secured thereon in any suitable manner as by welding. The peripheral edge of the valve disc 10 lies in a plane at an angle to the axis of the valve stem 9 so that it will be parallel to the inner face of the annular extension 6. The peripheral flange of the valve disc 10 normally seats on the shoulder 8.

A disc-like cap 11 is provided, having a right-angled peripheral shoulder in which a clamping ring 12 is mounted by means of the screws 13. Between the members 11 and 12 is clamped a sealing ring or washer 14 of suitable resilient material. The cap 11 is provided with an annular groove on its lower face arranged to expose the upper surface of the sealing ring 14 as clearly shown in Figure 1. The valve disc 10 has a small hole 16 through it which is connected as shown in Figure 1 with the annular groove 15, through a small radial channel 15a. The diameter of the port 16 may be that of a No. 60 drill, for example.

The disc 11 and attached parts is mounted on the valve stem 9 and is held in place by means of a washer 17, a nut 18 and a lift hook fixture 19. To prevent the leakage of gas along the valve rod 9 a standard sealing ring 20 is provided.

Mounted on the lower end of the rod 9 is a spider 21 which is held in place by a pair of jam nuts 22 and 23. Interposed between the lower end of the fixture 1—2 and the spider 21 is the spring 24, the tension of which when adjusted determines the pressure at which the relief valve blows off. It will be noted that when the valve is fully open, a decrease in flow area through the spring coils takes place and therefore supplemental area through the end of the spring is provided by spider 21.

In the use of this structure gas pressure in the storage tank can equalize through port 16 to pressure annular chamber 15 and create a downward thrust on sealing ring 14 above annular channel 5 (since annular channel 5 is at atmospheric pressure). This downward thrust effects a seal of ring 14 against valve seat 7. It will be noted that this sealing force is a direct function of the pressure to be sealed and as the pressure increases the sealing force increases until the spring can no longer overcome the pressure forces exerted over the area enclosed by valve seat 7. At this point the valve opens.

The sealing ring 14 can be renewed by removing the parts 19, 18 and 17 and lifting the disc 11 and attached parts from the end of the valve rod. The ring 12 is then removed and a new sealing ring 14 inserted. The parts are then replaced. This repair or maintenance can be effected even with the storage tank under full load because the disc 10 will form a sufficiently good seal at the shoulder 8, even with the sealing ring 14 removed.

In view of the above description it will be apparent to those skilled in the art that the subject matter of this invention is capable of some variation and I do not therefore desire to be limited except as required by the claims granted me.

What is claimed is:

1. A relief valve comprising a member having two concentric seats, a spring-loaded disk engaging one of said seats, said disk being mounted on a longitudinal rod and held in place by a shoulder on said rod, a cap member carrying an inner annular ring contacting said disk and a second outer annular ring, a sealing ring engaging said first mentioned disk, said sealing ring being held between the two annular rings of said cap member, the two annular rings and the sealing ring forming a chamber which is closed by said spring-loaded disk, an orifice extending through said spring-loaded disk into said chamber to supply pressure fluid to said chamber to force said sealing ring into sealing engagement with the outer one of said concentric seats when said sealing disk engages the inner one of said concentric seats.

2. In the combination in accordance with claim 1, the cap member and sealing ring being detachably mounted by said valve rod and removable from said valve while said first sealing disk remains seated.

THEODORE A. ST. CLAIR.

REFERENCES CITED

The following references are of record in the file of this patent:

UNITED STATES PATENTS

| Number | Name | Date |
|---|---|---|
| 763,208 | Robinson | June 21, 1904 |
| 1,774,690 | Willoughby | Sept. 2, 1930 |

FOREIGN PATENTS

| Number | Country | Date |
|---|---|---|
| 17,847 | Great Britain | of 1896 |